United States Patent
Lins de Medeiros et al.

(10) Patent No.: US 8,983,060 B2
(45) Date of Patent: Mar. 17, 2015

(54) DYNAMIC TARGET MARGIN ADAPTATION FOR DSL TRANSMISSION LINES

(75) Inventors: Eduardo Lins de Medeiros, Hägersten (SE); Boris Dortschy, Hägersten (SE); Aldebaro Klautau, Marco-Belem-Para (BR); Marcio Murilo Conte Monteiro, Belém (BR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 7 days.

(21) Appl. No.: 14/008,142

(22) PCT Filed: Apr. 12, 2011

(86) PCT No.: PCT/EP2011/001851
§ 371 (c)(1),
(2), (4) Date: Sep. 27, 2013

(87) PCT Pub. No.: WO2012/139596
PCT Pub. Date: Oct. 18, 2012

(65) Prior Publication Data
US 2014/0023189 A1    Jan. 23, 2014

(51) Int. Cl.
*H04B 3/32* (2006.01)
*H04L 5/00* (2006.01)

(52) U.S. Cl.
CPC ............. *H04B 3/32* (2013.01); *H04L 5/0046* (2013.01); *H04L 5/006* (2013.01)
USPC ............ 379/417; 375/222; 375/285; 370/201

(58) Field of Classification Search
None
See application file for complete search history.

(56) References Cited

U.S. PATENT DOCUMENTS

2005/0190826 A1* 9/2005 Van Bruyssel et al. ....... 375/222
2007/0230548 A1* 10/2007 Van de Wiel et al. ........ 375/219

FOREIGN PATENT DOCUMENTS

EP    1569402 A1    8/2005

* cited by examiner

*Primary Examiner* — Fan Tsang
*Assistant Examiner* — Jeffrey Lytle
(74) *Attorney, Agent, or Firm* — Coats & Bennett, PLLC

(57) ABSTRACT

A method and arrangement is proposed for adaptively generating a target noise margin for use on a DSL transmission line. The method includes determining a first quantity representing a current noise power on the line using line parameter data relating to the transmission performance of the line, determining a second quantity representing a worst-case noise power on said line using previously obtained values of the line parameter data, calculating the difference between the first and second quantities to generate a difference value, setting a target noise margin as at least equal to said difference value, and providing the target noise margin for use on the line upon initialisation of the line. In a preferred embodiment, the line parameter data is the bit loading on the line and the first and second quantities are values of the average signal-to-noise ratio on the line derived from the bit loading data.

17 Claims, 4 Drawing Sheets

DYNAMIC TARGET MARGIN ADAPTATION FOR DSL TRANSMISSION LINES

TECHNICAL FIELD

The present invention relates generally to methods and apparatus for improving the quality and stability of digital communications. It has particular relevance to the optimisation of data rates and stability over DSL transmission lines.

BACKGROUND

Digital subscriber line technology provides the potential for high-speed communication over existing telephone subscriber lines (also referred to as loops or the copper plant). However, time-varying noise conditions can severely impact on DSL performance. Such transient and impulse noise conditions caused, for example by crosstalk from neighbouring lines, the switching on or off of home appliances or even of fluorescent lights cause errors in the data transmission. If these errors are sufficiently severe, they can result in the line having to be re-trained or reset. The transient nature of this noise means that, while it may cause the line to retrain, it is often no longer present at the time the line is reinitialised. As a consequence, the line could be reset to its original data rate leaving it susceptible to further retrains when noise occurs again, and thus inherently unstable. This instability is more apparent at high data rates, as more of the available transmit power is utilized for data transmission rather than for transmission robustness, making the service more sensitive to noise. Yet often those applications requiring a higher bandwidth, such as Voice over IP or IPTV, are severely degraded when a line is unstable. Line instability is thus costly for the operator as instability limits the services an operator can offer successfully over its copper plant. Moreover, as the intermittent noise causing instability is present on some lines, but not all, there may be a need for manual intervention on a case-by-case basis.

Most DSL standards employ discrete multi-tone modulation (DMT), which partitions the channel into a number of parallel sub-channels. Each tone is used to transmit an amount of information that is determined according to the signal-to-noise ratio (SNR) on that sub-channel. The bit rate is determined by the number of bits allocated to each tone (also called the bit-load or bit loading). The bit rate is limited by the transmit power and is inversely dependent on noise power. Thus for any given transmit power, the available bit rate depends on the noise on the line in question.

In order to mitigate the effects of a fluctuating noise level, DSL systems conventionally allocate a target noise margin (in reality a SNR margin) to each DSL line. This margin is essentially the amount of noise increase that a DSL system can tolerate while maintaining a guaranteed bit error rate (BER). This noise margin is applied in the bit loading calculation above the noise level at the time of initialisation. If the noise power increases by a factor that is higher than this allocated margin, the DSL transceiver usually restarts. The target noise margin is conventionally allocated by a transceiver on start-up or following a reset after completing the initialisation procedure. In essence, the target margin defines how much power will not be used for information transmission, but instead serves to protect against noise increases by the same amount. The target margin thus determines the power that is allocated for bit loading, which is also set when initialising the line.

An unstable line can benefit from a higher target margin. Conversely, if the margin value is too high, this limits the bit rate unnecessarily and thus restricts the services that can be offered by the operator. Two of the most commonly used techniques for setting the target noise margin are automatic margin adaptation (AMA) and tiered rate adaptation (TRA). These techniques are examples of level 1 dynamic spectrum management (DSM), which is the optimisation of single lines by means of adjusting control parameters. Both methods share the same basic principle of monitoring an individual line to determine iteratively a set of control parameters (also referred to as a profile) which can provide stability. These methods are described and compared in NICC ND 1513 (2010-01) "Report on dynamic spectrum management (DSM) methods in the UK access network".

AMA monitors a DSL transceiver for packet errors over a set time interval and sets the target margin as part of a profile according to the number of retrains it suffers. If the line continues to suffer retrains with this profile, the line is again re-initialised with a new profile having a higher target margin. This process continues until the number of packet errors falls within the prescribed thresholds and a further retrain does not occur. In other words, the target margin is increased in a step-wise fashion after each retrain until a value is found that is sufficient to protect this line from any noise condition to come. As the margin is increased, then either power usage increases or data rate decreases. If the DSL is already operating at full power, the data rate will decrease with the increase in margin.

A problem with AMA is that unexpected retrain events can cause the target noise margin value to be increased to very high levels, such as 15 or 18 dB. While the line is protected from most retrains, these high margin values limit the achievable bit rates. If noise conditions improve, i.e. the noise power decreases, this line remains stuck at a low bit rate. If AMA converges, all managed lines are configured with a target margin which is sufficient to cover any noise condition to come. However, these target margins are kept constant and do not take the actual noise condition during showtime, i.e. the real noise level experienced during data transmission, into consideration. This leads to lines using full power, generating more crosstalk in the network and obtaining a suboptimal performance.

TRA works by determining the maximum bit rate that can be supported by a line without retraining. The bit rate is then set to a value that is lower than the determined maximum bit rate. Lines managed with TRA have their target noise margin set to a low value, typically 6 dB. Thus the overall transmit power can be lower than for an equivalent bit rate using AMA. However, any excess power resulting from the bit rate limitation essentially forms part of the SNR margin value, protecting the line against noise variations. In other words, TRA indirectly affects the margin size by defining a safe maximum bit rate.

TRA caps the bit rate value to a level which makes retrains unlikely to occur. By defining bit rate constraints TRA indirectly affects margin values, but eliminates the problem of lines getting stuck at low rates, since the bit rate setting is likely to be supported under all considered circumstances. However, in practice as TRA converges, lines may be limited to the worst-case bit rate. TRA is also sensitive to the amount of power allocated to the line. The higher the transmit power and maximum SNR margin are, the more stable the line will be. However allocated power is not directly controlled by the operator so unexpected retrain events may still occur.

SUMMARY

An object of the present invention is to provide a method and arrangement that provides a stable DSL line, yet does not unreasonably limit the bit rate.

This and other objects are achieved in a method for adaptively generating a target noise margin for use on a DSL transmission line, said method comprising the steps of: determining a first quantity representing a current noise power on said line using line parameter data relating to the transmission performance of the line, determining a second quantity representing a worst-case noise power on the line using previously obtained values of the line parameter data, calculating the difference between the first and second quantities to generate a difference value, setting a target noise margin as at least equal to the difference value, and providing the target noise margin for use on said line upon initialisation of said line.

By determining the target noise margin using values representing both a current noise condition and a worst case noise condition, the margin can be set to a value which is just sufficient to cover the worst-case noise level. The line rate will thus not remain unduly limited to a low value by an excessive signal-to-noise margin. Moreover, the method precludes the need to test multiple line profiles to achieve stability. It is merely necessary to monitor the line for a certain amount of time to determine a worst-case noise level.

Preferably the method includes the step of acquiring at least one value representing the current bit loading on the DSL line as the line parameter data. Moreover, the said step of determining the first quantity preferably comprises calculating an average signal-to-noise ratio value using the at least one current bit loading value and said step of determining the second quantity comprises determining an average signal-to-noise ratio value that represents a worst-case noise level using at least one bit loading value obtained previously.

It has been observed that the difference between the current average SNR of a line and average SNR of the line during previously recorded worst case noise conditions provides a reasonable estimate of the difference between current and worst case noise conditions. Advantageously, the average SNR can be estimated using only a single line parameter, namely the bit loading of the DSL line. The bit loading is a parameter that is readily available from the equipment of all operators and is reported in a manner that is both standardised and reliable. The method is thus particularly easy to implement using existing DSL hardware. In addition, the aggregate bit loading remains essentially constant after initialisation of the line, and thus need to be acquired only once before the next retrain of the line.

The average signal-to-noise ratio value that represents a worst-case noise level may be obtained by determining the lowest average signal-to-noise ratio value between at least two average signal-to-noise ratio values calculated using bit loading values obtained previously. Alternatively, the quantity that represents a worst-case noise level can be a function of several previously obtained SNR values in order to prevent infrequent noise conditions from unduly increasing the target noise margin. Such a function can be, for example, a weighted average of previously obtained SNR values. It is further advantageous when SNR values determined using previously obtained bit loading values are determined using bit loading data acquired in a fixed time window. This enables the generation of the target noise margin to adapt to changes in the noise conditions over time.

Preferably the target noise margin is set to a predetermined minimum value ($\gamma_{min}$) when said first quantity, i.e. the quantity representing current noise conditions, is lower than said second quantity, i.e. the quantity representing worst-case noise conditions. This is particularly useful during a learning phase of the method, when each newly determined first quantity can be used to update the value of the second quantity.

In a particularly favourable embodiment of the present invention, the average signal to noise ratio can be obtained using the following formula $$\overline{SNR} = \frac{\sum_{k=1}^{n} \sum_{j=1}^{b_k} L(j)}{n}$$

where $\overline{SNR}$ is the estimated average signal to noise ratio in dB, $b_k$ is the number of bits allocated in tone k, n is the number of tones used and L(j) is the incremental SNR increase corresponding to a bitload increase from (j−1) to j bits. The values of L(j) can be obtained from a lookup table. Since the bit loading per tone may vary over one line session or showtime, and the above formula calculates the average SNR tone by tone, it is possible that the average SNR will vary with any changes on the bit loading, even if the aggregate bit loading remains the same due to bit-swapping operations. Using this formula and an appropriate lookup table thus enables the accurate determination of average SNR for use in calculating the target noise margin when bit loading data is acquired more than once during a showtime session.

In accordance with an alternative simplified embodiment of the invention, the average signal-to-noise ratio can be obtained using the following formula $$\overline{SNR} = \frac{3 \cdot \sum_{k=1}^{n} b_k}{n}$$

where $b_k$ is the number of bits allocated in tone k and n is the number of tones used. This formula assumes a 3 dB increase in SNR per bit per tone. Thus the average SNR will not change providing the aggregate bit loading remains the same. This formula thus enables a faster and simpler calculation of the target noise margin requiring only one set of bit loading data per showtime session.

In a particularly preferred embodiment of the present invention, the target noise margin value is obtained by adding a predetermined margin value to the difference value, where the predetermined value is selected to provide a desired stability for said line. This predetermined margin value essentially functions as an additional safety margin. Its value can be adjusted to control the trade-off between performance and stability. In this way the method can be adapted to the specific stability requirements of an operator.

While the average SNR provides a good estimate of the noise conditions on a line, a more accurate determination of the target noise margin is obtained when the method includes the steps of acquiring a value representing the current allocated transmit power on said line as the line parameter data, generating a second difference value between the acquired current allocated power value and a value of allocated power obtained at the same time as the previously obtained at least one bit loading value used to determine the average signal-to-noise ratio value that represents a worst-case noise level, and adjusting the target noise margin using the second difference value.

Since the allocated power may well change over the course of a showtime session, the method preferably includes the step of acquiring a value representing the current allocated power on the line more than once between two retrains of the line.

Preferably the method in accordance with the present invention is computer implemented.

In accordance with a further aspect, the present invention also resides in a computer programme product including a computer readable medium having computer readable program code stored therein for causing a computer to adaptively generate a target noise margin for use on a DSL transmission line in accordance with the appended claims.

A still further aspect of the present invention resides in a controller for adaptively applying a target noise margin to a DSL transmission line as defined in the appended claims.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
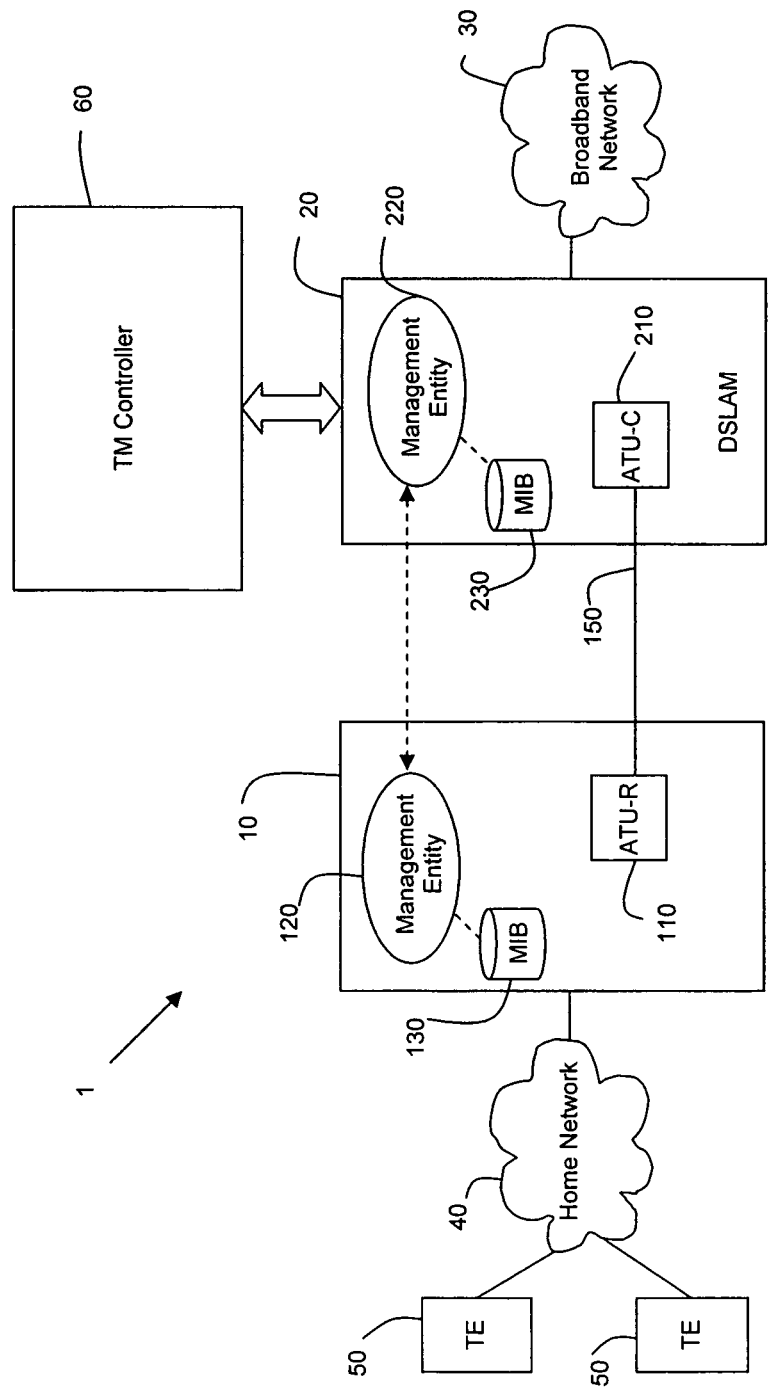
FIG. 1 is a schematic block diagram illustrating parts of a communications network used by an embodiment of the invention.

FIG. 1 is a schematic block diagram of part of a DSL network 1. The illustrated DSL network 1 includes a network termination unit 10 that is coupled to a home network 40, which in turn is coupled to customer's terminal equipment (TE) 50. The network termination unit 10 includes a modem or ADSL transceiver unit-Remote (ATU-R) 110. The network termination unit 10 also includes a management entity (ME) 120, which may include a management information base (MIB) 130 as illustrated in FIG. 1. The MIB 130 is a database of information that is maintained by the ME 120 and can be accessed using network management protocols such as SNMP, for example. The ME 120 may be any suitable hardware device, such as a microprocessor or microcontroller that is capable of operating as required by the applicable standards. The ME 120 collects performance data originating from the ATU-R 110 and stores this in the MIB 130. The ATU-R 110 is coupled to an ATU-C 210 at an access node, which in the illustrated embodiment is a DSL access multiplexer (DSLAM) 20, via a connection line 150. The line 150 is typically a twisted pair that also carries other communication services. The two transceiver units 110, 210 together support a high DSL data rate over the line 150. The DSLAM 220 also includes a management entity (ME) 220, which maintains an MIB 230 of performance data relating to the ATU-C. It is possible that only the DSLAM 220 holds an MIB 230 which stores performance data relating to both the ATU-C 210 and the ATU-R 110. The ATU-R 110 in the access node 10 also updates the ATU-C with performance data, either periodically or upon request. This information is also stored in the DSLAM MIB 230. As is well known to one skilled in the art, the DSLAM 20 will have several line cards and multiple ports per card, each port being connected to further lines leading to other customer's premises. The DSLAM 20 may be connected to a broadband network 30 or another network.

As illustrated in FIG. 1, the monitoring and control of transmission performance data, and specifically the setting of the noise target margin in accordance with the present invention is performed by a target margin controller (TM controller) 60 that is coupled to the DSL system 1 and, in particular, can communicate with the DSLAM MEs 220 and also access the DSLAM MIB 230 while controlling the operation of the ADSL transceivers (ATU-C, ATU-R). The TM controller 60 may be an entity that is located at the DSLAM 20 or a central office CO and controls multiple lines from these locations. Alternatively the TM controller 60 may be implemented in a server, that is located externally and independently of the DSLAM at another location in the network together with other servers, each of which includes a TM controller application. The TM controller 60 may then control DSL lines in multiple DSLAMs. In such an arrangement, the TM controller 60 may form part of a dynamic spectrum management controller that controls other parameters of each DSL line.

Figure 2:
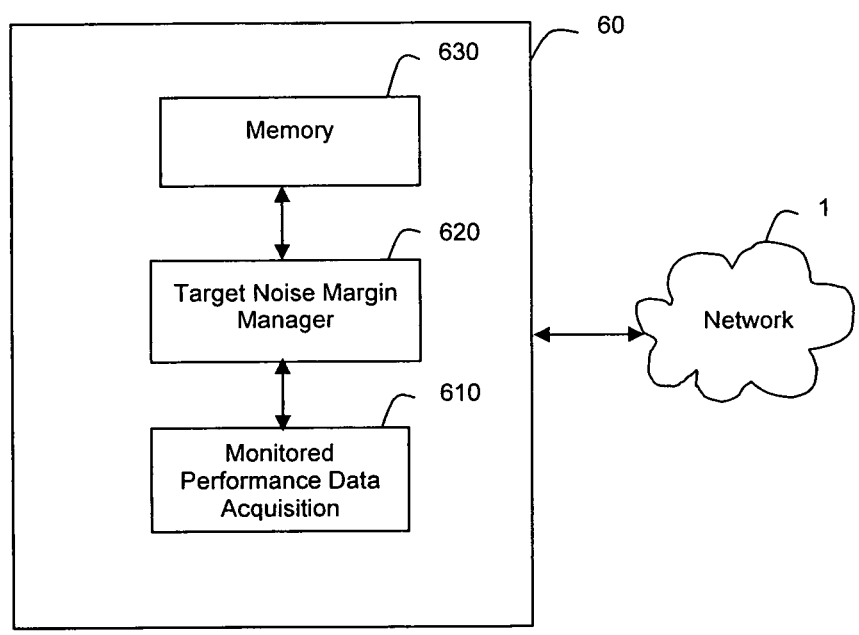
FIG. 2 is a schematic block diagram illustrating the functional elements of a dynamic spectrum management controller in accordance with the present invention.

FIG. 2 is a block diagram illustrating the functional arrangement of the TM controller 60. The controller includes a module 610 for acquiring monitored performance data from both sides of the monitored DSL lines, such as the line 150 in FIG. 1. This data can be obtained from the transceivers ATU-C, which in turn receives data from the ATU-R located at the customer's network terminating unit 10. As described below, this data includes the bit loading or bit rate of this line and may also include, the transmit power on the line. A storage device, memory 630 is provided for storing relevant performance data, specifically, data relating to an estimated worst-case noise condition for each line. A Target Noise Margin Manager (TNMM) 620 is also provided that has access to both the acquired data from module 610 and the stored data in memory 630 and sets a value of target noise margin for each line and for both upstream and downstream transmission over each line. The TM controller 60 is also coupled to the network 1 and receives asynchronous protocol messages from the DSLAM 20 when a retrain occurs, for example using the traps mechanism of the Simple Network Management Protocol (SNMP). It will be understood by those skilled in the art that the functional modules illustrated in FIG. 2 can be implemented in a suitable processing device with associated memory, input/output devices and network interfaces. As mentioned above, the TM controller 60 may be implemented in a server together with other network management operations, which together provide full dynamic spectrum management services.

In accordance with the present invention, the TM controller 60 calculates a future target noise margin for each line using data received from the DSLAMs upon initialisation of the line. The target noise margin is determined using both the worst-case noise conditions obtained through an extended monitoring of the line and on the current estimated noise level, which is the last recorded noise level prevailing just after the previous initialisation of the line. More particularly, the TM controller 60 determines a target noise margin to be used during the next initialisation of the line, i.e. for the next period of payload transmission or showtime that is based on the difference between the recorded worst-case noise condition as stored in memory 630 and a recorded current noise condition. Accordingly, when the current noise condition is high, and thus close to the worst-case noise condition, the margin can be kept small, as it is reasonable to assume that noise fluctuations will not go above the worst-case noise level. Conversely, when the current noise condition is low, the margin will be sufficient to "absorb" noise fluctuations that reach the worst-case noise condition. The margin will thus be higher but at a level that is based on a realistic prediction of possible noise fluctuation levels. This has the effect of reducing the power wastage and avoiding the unnecessary constraining of the bit rate.

Unfortunately, the noise level experienced on a line is not a parameter that is reported directly by conventional DSLAMs in a standardized manner. For this reason, and in accordance with the present invention, noise level is estimated indirectly. One conceivable way of estimating noise power would be to observe the attainable net data rate. The drawback of this approach is that attainable rate reporting is not consistent over equipment from different vendors. In accordance with a preferred embodiment of the present invention, therefore, it is proposed to estimate the noise level using a standard line parameter, namely, the bit loading, which is the number of bits allocated to each tone. This parameter is readily obtainable from the DSLAMs and is reported in a consistent manner across equipment from different vendors.

The bit loading for a DSL transceiver on tone k can be expressed as:

$$b_k = \log_2\left(1 + \frac{SNR_k}{\gamma_k \cdot \Gamma_k}\right) \quad (1)$$

Where:
$b_k$ is the number of bits allocated in tone k,
$SNR_k$ is the signal-to-noise ratio for tone k,
$\gamma_k$ is the SNR-margin for tone k and
$\Gamma_k$ denotes the signal-to-noise ratio gap for tone k, which is a function of the desired bit error rate (BER), typically $10^{-7}$.

The gap $\Gamma_k$ is an indicator of how closely the bit rate comes to the theoretical channel capacity.

The signal-to-noise ratio for tone k, $SNR_k$, can be defined as:

$$SNR_k = \frac{P_k |h_k|^2}{N_k} \quad (2)$$

Where:
$P_k$ denotes the allocated power at tone k,
$|h_k|^2$ denotes the squared magnitude of the direct channel gain at tone k and
$N_k$ represents the effective noise power.

If $f_s$ denotes the DMT symbol rate, the overall line bit rate R and transmit power $P_{total}$ can be defined as follows $$R = f_s \sum_k b_k$$

$$P_{total} = \sum_k P_k$$

Thus, when substituting equations (1) and (2) into that for the bit rate, R, it is clear that the bit rate of a DSL transceiver is limited by noise and available transmit power. The SNR margin is an amount of additional power that is meant to protect the transmission from fluctuations, specifically increases, in the noise level.

When the SNR is high, the aggregated bit-loading given in equation (1) can be represented in the dB-domain as $$\sum_k b_k \cong \sum_k \log(P_k) + \sum_k \log(|h_k|^2) - \sum_k \log(\Gamma \gamma_k) - \sum_k \log(N_k) \quad (3)$$

If the tone subscript k is dropped in favour of a dB indicator, equation (3) can conveniently be expressed in the dB domain as follows:

$$b \sim P_{dB} - \gamma_{dB} - N_{dB} + (|h|^2)_{dB} - \Gamma_{dB} \quad (3')$$

Thus, at the moment a DSL transceiver is started, its bit rate is defined by the allocated power P, the magnitude of channel direct transfer function $|h_k|^2$, the SNR-margin $\gamma_k$, the signal-to-noise ratio gap $\Gamma_k$ and the noise power $N_k$, as given in equation (3).

For DSL, it can be assumed that the channel gains are fixed, therefore the term $\Sigma_k \log(|h_k|^2)$ in equation (3) (or $(|h_k|^2)_{dB}$ in equation (3')) is constant. Similarly, the SNR gap $\Gamma_k$ is constant for all tones. At initialization, the SNR margin, $\gamma_k$, can be assumed to be constant over all tones and assumes a value defined by the target margin $\gamma_{target}$. Afterwards, the effective SNR margin value fluctuates according to the variations in the noise power $N_k$. Although the noise power is frequency dependent, bit swap operations maintain the SNR margin substantially constant over tones. Therefore the relationship between margin variation and noise power can be approximated in dB as $$-\gamma_{db} = \Delta N_{db} \quad (4)$$

Using these assumptions, the average SNR over the used tones n can be estimated as a function of the bit loading as follows:

$$\overline{SNR} = \frac{\sum_{k=1}^{n} \sum_{j=1}^{b_k} L(j)}{n} \quad (5)$$

where $L(b_k)$ represents the increase in SNR associated with the allocation of $b_k$ bits, which is relative to the SNR necessary to allocate $(b_k-1)$ bits. Table 1 gives values for $L(b_k)$ obtained using Eq. (1) and assuming an effective margin $\gamma_k=0$ $\gamma_k=0$ and gap $\Gamma=10$ dB $\Gamma=10$ dB.

TABLE 1

| $b_k$ | $L(b_k)$ dB |
|---|---|
| 1 | 10 |
| 2 | 4.7712 |
| 3 | 3.6798 |
| 4 | 3.3099 |
| 5 | 3.1527 |
| 6 | 3.0798 |
| 7 | 3.0446 |
| 8 | 3.0274 |
| 9 | 3.0188 |
| 10 | 3.0145 |
| 11 | 3.0124 |
| 12 | 3.0114 |
| 13 | 3.0108 |
| 14 | 3.0106 |
| 15 | 3.0104 |

It can be seen from Table 1 above, that as the number of allocated bits increases, the increase in SNR $L(b_k)$ converges towards 3 dB. A simplified estimation of the average SNR that assumes a 3 dB SNR increase per bit allocated to a certain tone k can thus be defined as follows:

$$\overline{SNR} = \frac{3 \cdot \sum_{k=1}^{n} b_k}{n} \quad (5')$$

As can be seen from equation (1), this assumption is reasonable except when the SNR is low.

The SNR estimate shown in (5) or (5') is averaged over the n tones used by the DSL transceiver. Determining the lowest average SNR value estimated with either the method of equation 5 or 5' over a certain period of observation can be used to indicate the worst-case noise situation. This is explained further below.

The average SNR estimation obtained in equation (5) or (5') represents the amount of SNR necessary to allocate a certain number of bits with $\gamma_{dB}=0$. Using the assumption that all other terms in equation (3) are constant or known, the difference between two average SNR estimates determined at times t and t+1 is equivalent to the noise power variation. Equation (6) describes this relationship, where all values are expressed in dB.

$$\overline{SNR_{t+1}} - \overline{SNR_t} \cong -(N_{t+1} - N_t) \quad (6)$$

Since the allocated power and SNR margin values are known, the worst-case noise conditions (i.e. the highest encountered noise power) will be indicated by the lowest average SNR value $\overline{SNR_w}$. A retrain of the line occurs if the increase in noise power is greater or equal to the SNR margin after initialization. In other words, a retrain will occur if the actual SNR margin falls below zero, i.e. if $\gamma_{dB} \leq 0$. Thus it can be assumed that when a retrain occurs, the actual SNR margin $\gamma_{dB}$ is close to 0 and therefore the actual average SNR is very close to the average SNR estimated in equation (5). Under these conditions, the difference between worst case average SNR and the last estimated average SNR (i.e. that value of SNR that represents the current noise conditions) will indicate a safe value for the target margin to be used next, i.e.

$$\gamma_{t+1} \geq \overline{SNR_t} - \overline{SNR_w} \quad (7)$$

In practice, it may be preferable to add a small additional safety margin, referred to as δ, so that, with all involved quantities expressed in dB, the target margin $\gamma_{t+1}$ is defined as:

$$\gamma_{t+1} = \overline{SNR_t} - \overline{SNR_w} + \delta \quad (8)$$

The value of δ may be around 1 or 2 dB and can be set according to the operator's requirements. This safety margin δ could even be set to a negative value to favor higher bit rates over stability.

The proposed solution thus calculates a target margin value based on the difference between current noise conditions as represented by an average SNR calculated on the basis of the bit loading of the line, and the worst-case noise level as represented by, for example, the lowest recorded average signal-to-noise values. The bit loading data $b_k$ can be retrieved from the DSLAM or DSLAMs at any time after the line has been initialised. However, it is preferable that this parameter value is obtained immediately after initialisation, to ensure that an adapted target margin can be available should the line be caused to retrain after only a short time. $\overline{SNR_w}$, the worst-case noise condition as represented by the lowest estimated average SNR value is preferably updated whenever a lower average SNR estimate is made, so that over time, it correctly reflects the worst-case noise condition. This can be done by comparing each new average SNR estimate with a previous value and storing the lowest value as that representing the worst-case noise condition. Alternatively, each estimated average SNR value may be stored as part of an array, permitting the lowest value to be identified. This system has the advantage that it allows only values obtained in a certain time window to be taken into account. The target margin calculation can thus automatically adapt to any long-term improvement in the line. For example, it would be possible to determine a worst-case noise condition using only average SNR values estimated over the previous 3 or 6 months. This means that seasonal changes in noise conditions can be taken into account without undue increases in the target noise margin. Such a system is also less sensitive to infrequent and irregular noise peaks, which could otherwise drive down the worst-case average SNR and unnecessarily elevate the target noise margin. Alternatively, the comparison could be done over only a fixed number of the last recorded values, for example the last 100 or 200 values of average SNR recorded. This comparison is not limited to comparing to a worst SNR over a period of time or a number of recordings, but can be based on any suitable function of the recorded values.

The relationship between an estimate of average SNR of a line and the bit loading of the line given in equations (5) and (5') provide two possible implementations for generating a target noise margin in accordance with the present invention. Equation (5) provides a more accurate estimate of SNR as it takes into account variations due to the different bit loading of each tone. In this implementation, the SNR increment values per bit given in Table 1 are provided in a lookup table that is accessible by the Target Noise Margin Manager 620 illustrated in FIG. 2. Since bit-swap operations may alter the bit loading per tone, the average SNR could be updated to take account of any changes during a showtime session. The simplified estimate given in equation (5') can be used alone to calculate the average SNR just after initialisation of the line. Since this estimate is based on the aggregate bit loading of all tones, there will be not change to the estimated average SNR value, so there is no need to update this value. It will be understood by those skilled in the art that both the proposed estimates of the average SNR value and also the values used in the SNR increment lookup table are for the purposes of illustration only and are not limiting. For example, the estimate or the values could be adapted to incorporate vendor-specific bit-loading strategies.

Figure 3:
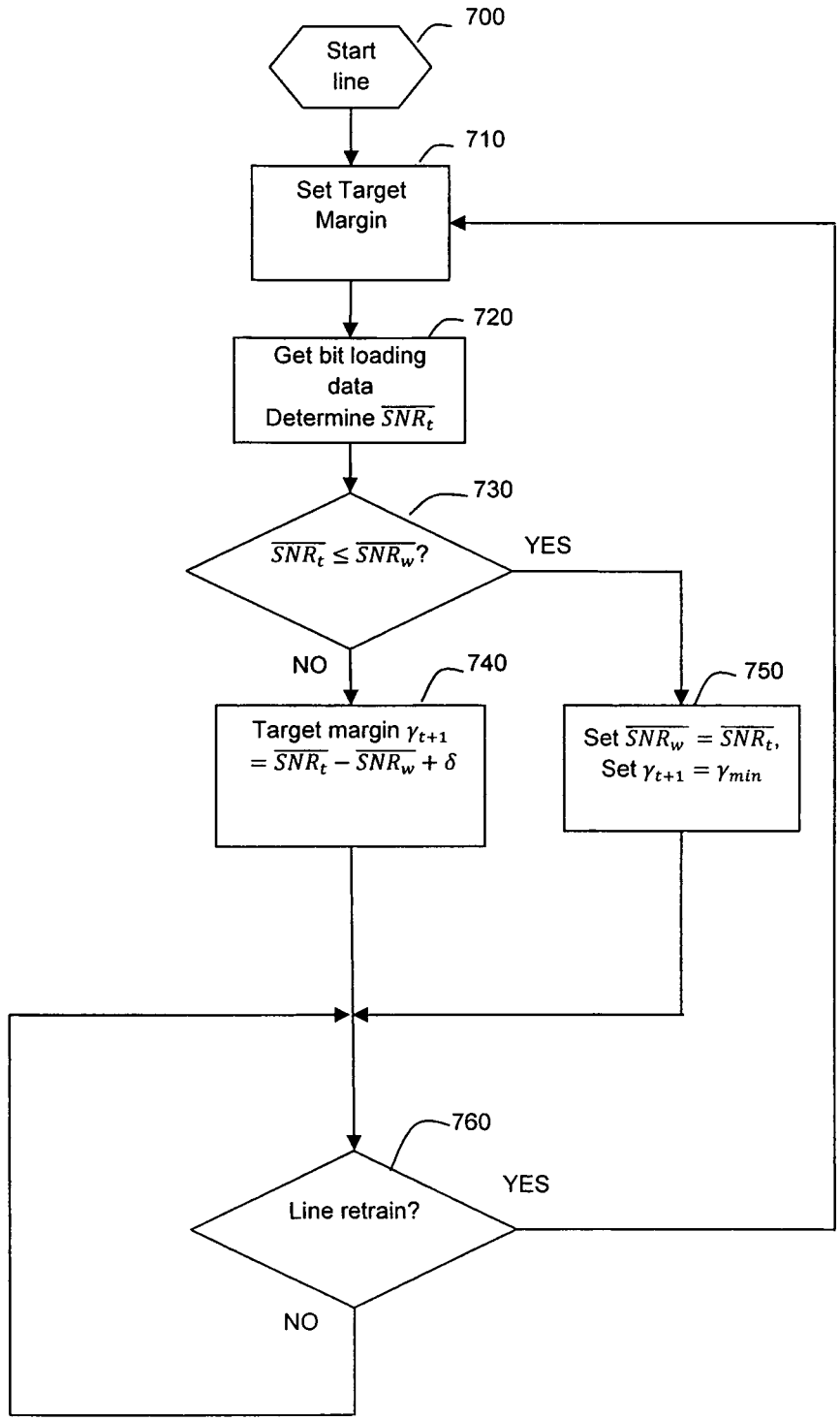
FIG. 3 is a flowchart showing the operation of the TM controller in accordance with one embodiment of the present invention and FIG. 4 is a flowchart showing the operation of the TM controller in accordance with a second embodiment of the present invention

The target noise margin generating function performed in the TM controller 60 is described below with reference to the flow chart in FIG. 3. The process starts at step 700 with the start-up of the line. At step 710 a previously determined target noise margin value $\gamma_t$ is applied to the line. This target noise margin value is provided by the TM controller 60 to the DSLAM in question. When the line is started for the first time or after a long period of time, it is assumed that any stored value for the worst case noise condition on the line will no longer be representative of current line conditions. For this reason, the target noise margin is set at a minimum value $\gamma_{min}$, e.g. 6 dB. The method then proceeds to step 720 with the acquiring of data via module 610 from the corresponding DSLAM on the bit loading for the managed line once the line has reached showtime The bit loading will be determined during initialisation when a line (re-)starts. Thus the data is acquired at least just after the line has reached showtime status. In the illustrated method of FIG. 3, it is assumed that the bit loading stays constant throughout the payload transmission, i.e. until the next restart of the line. It will be understood that even if bit-swap operations were to change the bit loading on the individual tone, the average SNR estimate using simplified equation (5') would anyway not change as the aggregate bit loading would remain the same. With the acquired bit loading values (or at least the bit rate) the TNMM 620 estimates the current average signal-to-noise ratio $\overline{SNR_t}$ using equation (5') or equation (5) using a lookup table, e.g. Table I. At step 730, this average signal-to-noise ratio value is compared with a previously stored (lowest) average signal-to-noise ratio $\overline{SNR_w}$ representing a worst case noise condition stored in memory 630. If the calculated current average signal-to-noise ratio value is lower that the stored worst-case noise value, ($\overline{SNR_t}$<$\overline{SNR_w}$), this means that the recently encountered and monitored noise level represents a new reference for the worst-case noise condition to date. The method then moves to step 750 where the worst-case noise value $\overline{SNR_w}$ is updated with this new value in memory 630 and the new target margin value $\gamma_{t+1}$ set to a predefined minimum target margin value $\gamma_{min}$, e.g. 6 dB. This new target margin value is then stored in memory 630 pending the next initialization of the line. The new target margin $\gamma_{t+1}$ will also be set to the predefined minimum target margin value $\gamma_{min}$ if no valid worst case noise value $\overline{SNR_w}$ is stored, for example, upon first line start-up.

If the comparison in step 730 reveals that the current average signal-to-noise ratio value $\overline{SNR_t}$ is higher that the stored worst case noise value $\overline{SNR_w}$, i.e. the current noise level is lower than the worst case noise level, the method proceeds to step 740 where the new target margin value $\gamma_{t+1}$ is calculated as the difference between these two values plus an optional predefined safety margin, i.e. $\gamma_{t+1} = \overline{SNR_t} - \overline{SNR_w} + \delta$, and this value stored in memory 630. The calculated new target margin $\gamma_{t+1}$ will be applied only at the next initialization of the line. At step 760, it is checked whether a retrain has occurred and the method enters a loop pending an asynchronous protocol message from the DSLAM indicating that the line has retrained. A retrain will occur if the noise conditions have worsened to the extent that the initial effective margin $\gamma_t$ has been entirely depleted by prevailing noise. If a retrain occurs, the method goes back to step 710 and the new target margin $\gamma_{t+1}$ stored in memory 630 is applied to the line for use in the next showtime period. $\gamma_{t+1}$ The average SNR estimate defined in equations (5) and (5') are based on the assumption that allocated power (the term $\Sigma_k \log(P_k)$ in equation (3)) remains substantially constant after the initialisation of the line. In practice, this assumption may not hold true. In some cases, therefore, it may be preferable to take account of the change in allocated power when determining the target noise margin. Equation 4 which defines the relationship between margin variation and noise power variation should then more correctly read as $$-\Delta\gamma_{db} = \Delta N_{db} - \Delta P_{db} \quad (4')$$

Where $\Delta P_{db}$ is the variation in allocated power. Similarly, equation (6), which describes a change in average SNR versus a change in noise power, would become:

$$\overline{SNR_{t+1}} - \overline{SNR_t} \cong (P_{t+1} - P_t) - (N_{t+1} - N_t) \quad (6')$$

When changes in the allocated power are taken into account, the target noise margin, with all involved quantities expressed in dB, becomes:

$$\gamma_{t+1} = (\overline{SNR_t} - \overline{SNR_w}) - (P_t - P_w) + \delta \quad (7')$$

Where $P_t$ is the allocated power at the time the bitloading, underlying the calculation of $\overline{SNR_t}$, is retrieved and $P_w$ is the value corresponding to the allocated power when the worst case SNR value $\overline{SNR_w}$ occurred.

Figure 4:
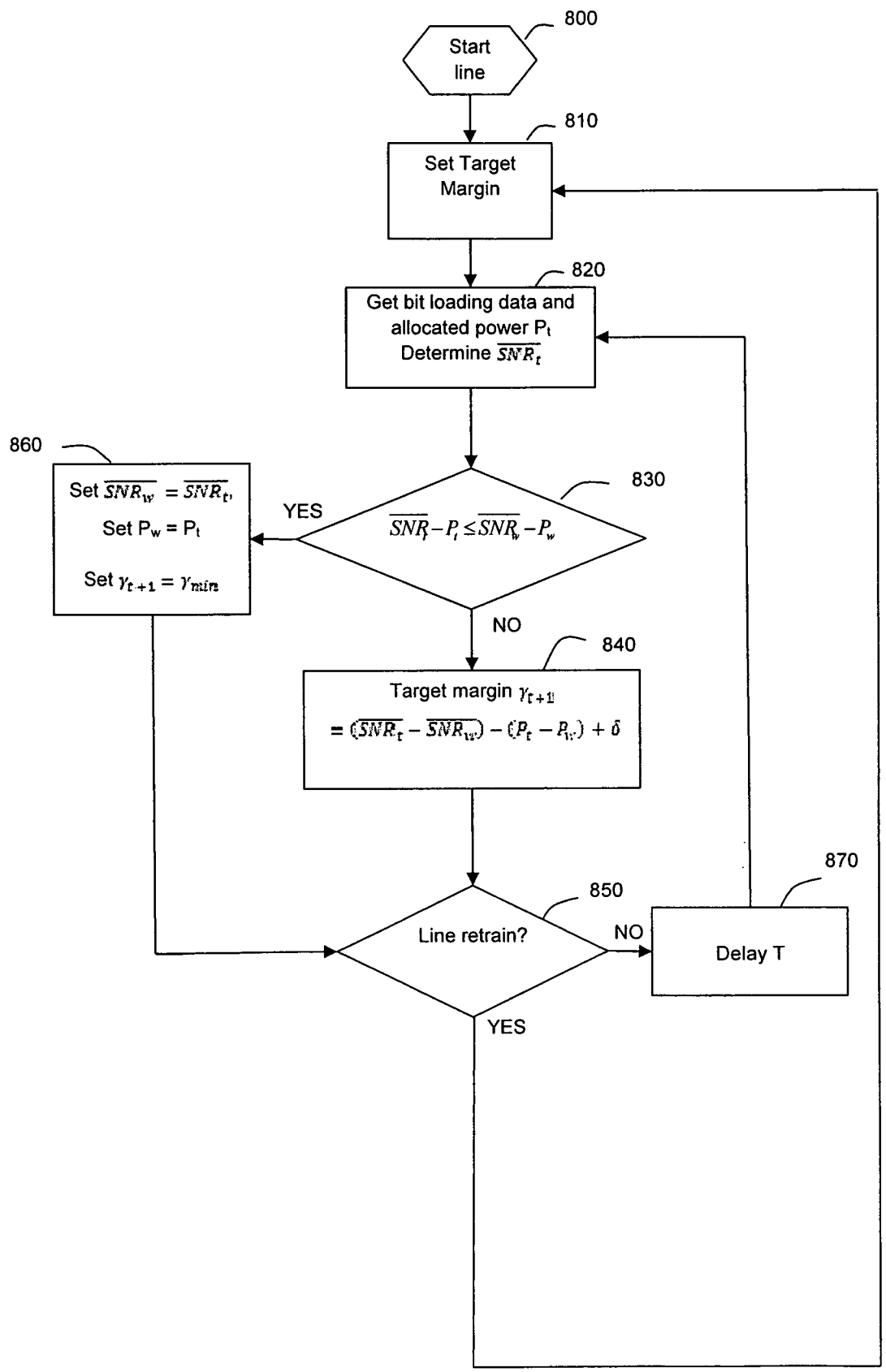

Since the allocated power and the bitloading table can change after initialisation, it is necessary to monitor and if necessary update these values throughout the showtime of a line. FIG. 4 is a flowchart illustrating a modified process for determining the target noise margin when a change of the allocated power and bitloading is taken into account. This method differs primarily over that shown in FIG. 3 by additional acquisition steps to periodically update the allocated power and bitloading. The method of FIG. 4 starts at step 800 with the start of the line. At step 810 the target margin determined previously is set. At step 820, the bit loading data and allocated power is acquired from the DSLAM and the current average SNR (($\overline{SNR_t}$) is determined using equation (5) and a lookup table. At step 830 a comparison is made between the current average signal to noise value with a previously stored worst-case SNR value, both compensated for a change in transmit power. Thus a comparison is made between the current average SNR value adjusted using the current allocated power $P_t$ and the stored worst-case SNR value that is adjusted using the value of allocated power $P_w$ acquired and stored at the same time. As in the method of FIG. 3, if the current average SNR value compensated for a change in transmit power is lower than the previously stored worst-case SNR value compensated for a change in transmit power, the latter is updated at step 860. In this method, however, the allocated power value $P_t$ acquired at step 820 is also stored as the worst-case allocated power $P_w$ value at step 860. The worst-case values of SNR and allocated power are thus updated as a pair. The target noise margin is then set to a predetermined minimum value $\gamma_{min}$. If, at step 830, the stored worst-case SNR value compensated for a change in transmit power is lower than the current average SNR value compensated for a change in transmit power, the method moves to step 840 where the target noise margin to be applied next is calculated using equation (7'). The new target noise margin determined either at step 840 or step 860 is then applied to the line at step 810 if a retrain is signalled, e.g. by an asynchronous protocol message, as determined at step 850. With no line retrain, the method moves to step 870 where a delay T is imposed, which represents a desired time interval, e.g. 15 minutes. After the delay T, the method moves to step 820 where the allocated power and bitloading data is again acquired and the current values updated. The method then proceeds to step 830.

The above described methods can make use of the Simple Network Management Protocol (SNMP) traps mechanism to obtain asynchronous messages from the DSLAM when a retrain occurs.

It is clear from the above described methods that the target margin updated when a retrain occurs will be set to a value which is just sufficient to cover the worst-case noise level. The line rate will thus not remain unduly limited to a low value by an excessive signal-to-noise margin. Moreover, the method precludes the need to iterate through multiple line profiles to achieve stability. It is merely necessary to monitor the line for a certain amount of time to determine a worst-case noise level.

It possible to adapt the method such that the worst-case average SNR value is not the lowest value of SNR encountered. For example, a sliding window method can be used to determine the worst-case noise conditions, such that only the most recent values of the estimated average SNR are taken into account when determining the worst-case average SNR value the impact of infrequent and irregular noise peaks on the performance of the line can be further reduced. Alternatively, worst case average SNR value could be based on a number of separate lowest average SNR values recorded in separate data transmission or showtime sessions, for example an average or weighted average value of such recorded values.

In addition, the value of the added safety margin $\delta$ and also the noise detection algorithm can be adjusted to control the trade-off between performance and stability. In this way the method can be adapted to the specific stability requirements of an operator.

Using the bit loading as a monitored parameter means that the method is particularly easy to implement using existing DSL hardware, as this parameter is reliably reported in a consistent and standardized manner by all operators for both upstream and downstream transmission over a DSL line.

Both the method and arrangement described herein are applicable for all DMT-based DSL standards, and thus can be equally successfully implemented in ADSLx and VDSL2, for example.

The invention claimed is:

1. A method for adaptively generating a target noise margin for use on a DSL transmission line, the method comprising:
   acquiring at least one value representing the current bit loading on the DSL line as line parameter data;
   determining a first quantity representing a current noise power on the DSL line using the line parameter data by calculating an average signal-to-noise ratio value using the at least one current bit loading value;
   determining a second quantity representing a worst-case noise power on the DSL line by determining an average signal-to-noise ratio value that represents a worst-case noise level using at least one bit loading value obtained previously;
   calculating the difference between the first and second quantities to generate a difference value;
   setting a target noise margin as at least equal to the difference value;
   providing the target noise margin for use on the DSL line upon initialization of the DSL line.

2. The method of claim 1, wherein the determining the second quantity comprises determining the lowest average signal-to-noise ratio value between at least two average signal-to-noise ratio values calculated using bit loading values obtained previously.

3. The method of claim 1, further comprising setting the target noise margin to a predetermined minimum value in response to the first quantity being lower than the second quantity.

4. The method of claim 3:
   wherein the determining the second quantity comprises determining the lowest average signal-to-noise ratio value between at least two average signal-to-noise ratio values calculated using bit loading values obtained previously;
   wherein the at least two previously obtained bit loading values relate to bit loading data acquired in a fixed time window.

5. The method of claim 1, wherein the calculating the average signal-to-noise ratio value ($\overline{SNR}$) includes applying the following formula:

$$\overline{SNR} = \frac{\sum_{k=1}^{n} \sum_{j=1}^{b_k} L(j)}{n}$$

where $b_k$ is the number of bits allocated in tone k, n is the number of tones, L(j) is the incremental SNR increase between two bits per tone; and further comprising obtaining values of L(j) from a lookup table.

6. The method of claim 5, further comprising acquiring at least one value representing the current bit loading on the DSL line more than once between two retrains of the DSL line.

7. The method of claim 1, wherein the calculating the average signal to noise ratio value ($\overline{SNR}$) includes applying the following formula:

$$\overline{SNR} = \frac{3 \cdot \sum_{k=1}^{n} b_k}{n}$$

where $b_k$ is the number of bits allocated in tone k and n is the number of tones.

8. The method of claim 1, wherein the setting the target noise margin value comprises adding a predetermined value to the difference value to generate the target noise margin, the predetermined value being selected to provide a desired stability for the DSL line.

9. The method of claim 8, further comprising acquiring a value representing the current allocated power on the DSL line more than once between two retrains of the DSL line.

10. The method of claim 1, further comprising:
    acquiring a value representing the current allocated power on the DSL line as the line parameter data;
    generating a second difference value between the acquired current allocated power value and a value of allocated power obtained at the same time as the previously obtained at least one bit loading value used to determine the average signal-to-noise ratio value that represents a worst-case noise level;
    adjusting the target noise margin based on the second difference value.

11. The method of claim 1, further comprising applying the target noise margin after a retrain of the DSL line.

12. A computer program product stored in a non-transitory computer readable medium for causing a computer to adaptively generate a target noise margin for use on a DSL transmission line, the computer program product comprising software instructions which, when run on the computer, causes the computer to:
    acquire at least one value representing the current bit loading on the DSL line as line parameter data;
    determine a first quantity representing a current noise power on the DSL line using the line parameter data by calculating an average signal-to-noise ratio value using the at least one current bit loading value;
    determine a second quantity representing a worst-case noise power on the DSL line by determining an average signal-to-noise ratio value that represents a worst-case noise level using at least one bit loading value obtained previously;
    calculate the difference between the first and second quantities to generate a difference value;
    set a target noise margin as at least equal to the difference value;
    provide the target noise margin for use on the DSL line upon initialization of the DSL line.

13. A controller for adaptively applying a target noise margin to a DSL transmission line, the controller being coupled to a DSL network, the controller comprising:
    a data acquisition circuit configured to acquire line parameter data representing the transmission performance over the DSL line;
    memory;

a target noise margin manager circuit coupled to the data acquisition circuit and the memory;

wherein the data acquisition circuit is configured to obtain data representing the current bit loading on the DSL line as the line parameter data;

the target noise margin manager circuit is configured to:
- determine a first quantity representing a current noise power on the DSL line by calculating an average signal-to-noise ratio value using the current bit loading data acquired by the data acquisition circuit and storing the quantity in the memory;
- determine a second quantity representing a worst-case noise power on the DSL line by determining an average signal to noise ratio value that represents a worst-case noise level using bit loading data obtained previously;
- calculate the difference between the first and second quantities to generate a difference value;
- set a target noise margin as at least equal to the difference value;
- provide the target noise margin to the network for use on the DSL line upon initialization of the DSL line.

14. The controller of claim 13, wherein the target noise margin manager circuit is further configured to determine the second quantity by determining the lowest of at least two average signal-to-noise ratio values calculated using bit loading data obtained previously for at least two separate points in time and stored in the memory.

15. The controller of claim 13, wherein the target noise margin manager circuit is further configured to set the target noise margin to a predetermined minimum value in response to the first quantity representing a higher level of noise power on the DSL line than the second quantity.

16. The controller of claim 13, wherein the target noise margin manager circuit is further configured to add a predetermined value to the difference value to generate the target noise margin, the predetermined value being selected to provide a desired stability for the DSL line.

17. The controller of claim 13:
wherein the data acquisition circuit is further configured to obtain data representing the current allocated power on the DSL line;

wherein the target noise margin manager circuit is configured to:
- calculate a second difference value between the acquired current allocated power data and a value of allocated power obtained at the same time as the previously obtained bit loading data used to determine the average signal to noise ratio value that represents a worst-case noise level;
- adjust the target noise value based on the second difference value.

* * * * *

UNITED STATES PATENT AND TRADEMARK OFFICE
CERTIFICATE OF CORRECTION

PATENT NO. : 8,983,060 B2
APPLICATION NO. : 14/008142
DATED : March 17, 2015
INVENTOR(S) : Lins de Medeiros et al.

It is certified that error appears in the above-identified patent and that said Letters Patent is hereby corrected as shown below:

In the Specification

In Column 4, Line 32, delete " $\overline{SNR} - \dfrac{3 \cdot \sum_{k=1}^{n} b_k}{n}$ " and insert -- $\overline{SNR} = \dfrac{3 \cdot \sum_{k=1}^{n} b_k}{n}$ --, therefor.

Signed and Sealed this
First Day of December, 2015

Michelle K. Lee
*Director of the United States Patent and Trademark Office*